(12) United States Patent
Crolley

(10) Patent No.: US 7,778,873 B2
(45) Date of Patent: Aug. 17, 2010

(54) SYSTEM AND METHOD OF PROVIDING ADVERTISEMENTS TO WI-FI DEVICES

(75) Inventor: C. Wayne Crolley, Bryant, AR (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1101 days.

(21) Appl. No.: 11/110,980

(22) Filed: Apr. 20, 2005

(65) Prior Publication Data
US 2006/0242010 A1    Oct. 26, 2006

(51) Int. Cl.
*G06Q 30/00* (2006.01)
(52) U.S. Cl. ............................. 705/14.64; 705/14.69
(58) Field of Classification Search ............ 705/14, 705/10, 14.64, 14.4, 14.46, 14.69, 14.7
See application file for complete search history.

(56) References Cited

U.S. PATENT DOCUMENTS

| | | | | |
|---|---|---|---|---|
| 5,627,549 | A * | 5/1997 | Park ............................ | 701/300 |
| 5,943,653 | A * | 8/1999 | Ross et al. ................. | 705/14.35 |
| 6,178,411 | B1 * | 1/2001 | Reiter ......................... | 705/408 |
| 6,269,361 | B1 * | 7/2001 | Davis et al. ........................ | 1/1 |
| 6,332,127 | B1 * | 12/2001 | Bandera et al. ................ | 705/14 |
| 7,290,046 | B1 * | 10/2007 | Kumar ....................... | 709/223 |
| 7,305,240 | B2 * | 12/2007 | Chou et al. .................. | 455/450 |
| 7,308,414 | B2 * | 12/2007 | Parker et al. ..................... | 705/7 |
| 7,418,402 | B2 * | 8/2008 | McCrossin et al. ............ | 705/26 |
| 7,421,454 | B2 * | 9/2008 | DeShan et al. ........... | 707/104.1 |
| 7,516,086 | B2 * | 4/2009 | Chu et al. ..................... | 705/14 |
| 2002/0049640 | A1 | 4/2002 | Sheriff et al. | |
| 2002/0161598 | A1 * | 10/2002 | Kim ............................... | 705/1 |
| 2003/0046420 | A1 * | 3/2003 | Breiter et al. ............... | 709/237 |
| 2003/0065805 | A1 * | 4/2003 | Barnes, Jr. .................. | 709/231 |
| 2003/0070167 | A1 * | 4/2003 | Holtz et al. .................... | 725/32 |
| 2003/0134648 | A1 * | 7/2003 | Reed et al. .................. | 455/456 |
| 2003/0200299 | A1 * | 10/2003 | Jamison, III ................ | 709/223 |
| 2004/0036622 | A1 * | 2/2004 | Dukach et al. ........... | 340/691.6 |
| 2004/0122735 | A1 * | 6/2004 | Meshkin ....................... | 705/14 |
| 2004/0215559 | A1 * | 10/2004 | Rebenack et al. ............. | 705/40 |
| 2004/0225564 | A1 * | 11/2004 | Walsh et al. ................... | 705/14 |
| 2004/0225746 | A1 * | 11/2004 | Niell et al. .................. | 709/231 |
| 2005/0021401 | A1 * | 1/2005 | Postrel ........................ | 705/14 |
| 2005/0027594 | A1 * | 2/2005 | Yasnovsky et al. ............ | 705/14 |

(Continued)

FOREIGN PATENT DOCUMENTS

EP    1 115 077 A2    7/2001

(Continued)

*Primary Examiner*—Lynda Jasmin
*Assistant Examiner*—Adam Chornesky
(74) *Attorney, Agent, or Firm*—Toler Law Group

(57) ABSTRACT

A method of advertising is disclosed an includes monitoring at least one Wi-Fi access point of a Wi-Fi network. Also, the method includes identifying at least one Wi-Fi device after the at least one Wi-Fi device associates with the Wi-Fi access point and determining at least one type of media file that is supported by the Wi-Fi device. Further, the method includes transmitting at least one advertisement to the device that is specific to the location of the Wi-Fi access point. The advertisement is transmitted in a format that corresponds to the at least one type of media file supported by the Wi-Fi device.

20 Claims, 5 Drawing Sheets

U.S. PATENT DOCUMENTS

| | | | |
|---|---|---|---|
| 2005/0055431 A1* | 3/2005 | Jones et al. | 709/223 |
| 2005/0065844 A1* | 3/2005 | Raj et al. | 705/14 |
| 2005/0075093 A1* | 4/2005 | Lei et al. | 455/412.1 |
| 2005/0209861 A1* | 9/2005 | Hewes et al. | 705/1 |
| 2005/0221843 A1* | 10/2005 | Friedman et al. | 455/456.6 |
| 2005/0227700 A1 | 10/2005 | Kirkland et al. | |
| 2006/0087979 A1* | 4/2006 | Schine et al. | 370/248 |
| 2006/0092931 A1* | 5/2006 | Walter et al. | 370/389 |
| 2006/0106850 A1* | 5/2006 | Morgan et al. | 707/101 |
| 2006/0111967 A1* | 5/2006 | Forbes | 705/14 |
| 2006/0173745 A1* | 8/2006 | Disterdick | 705/14 |
| 2006/0178932 A1* | 8/2006 | Lang | 705/14 |
| 2006/0184640 A1* | 8/2006 | Hatch | 709/217 |
| 2006/0242010 A1* | 10/2006 | Crolley | 705/14 |
| 2006/0253291 A1* | 11/2006 | Ishigai et al. | 705/1 |
| 2007/0094698 A1* | 4/2007 | Bountour et al. | 725/132 |
| 2007/0208864 A1* | 9/2007 | Flynn et al. | 709/227 |
| 2007/0287473 A1* | 12/2007 | Dupray | 455/456.1 |
| 2008/0010372 A1* | 1/2008 | Khedouri et al. | 709/224 |
| 2008/0097858 A1* | 4/2008 | Vucina et al. | 705/14 |
| 2008/0109317 A1* | 5/2008 | Singh | 705/14 |
| 2008/0139217 A1* | 6/2008 | Alizadeh-Shabdiz et al. | 455/456.1 |

FOREIGN PATENT DOCUMENTS

EP            1 202 203 A3      10/2003

* cited by examiner

SYSTEM AND METHOD OF PROVIDING ADVERTISEMENTS TO WI-FI DEVICES

FIELD OF THE DISCLOSURE

The present disclosure relates to wireless communication and providing advertisements via Wi-Fi devices.

BACKGROUND

Portable communication devices, e.g., cellular telephones, portable digital assistants, and 802.11 devices, are very useful for obtaining information while traveling. For example, a user can call an information service to obtain the location of a gas station, restaurant, etc. Further, a user can access the Internet or a Wide Area Network via a Wi-Fi device and input a query in order to obtain information about a business, a local attraction, a civic event, or any other point of interest. These systems are not proactive and require an input from a user before information about a business, location, etc. is sent to the requesting device. Additionally, GPS systems have been provided that can track the location of a user and show the location of the user on an electronic map. However, these systems include limited information and typically, the electronic map provided by the GPS system is simply a map with little other information, e.g., information about the hours of operation of a particular business or point of interest. Further, with the proliferation of various different Wi-Fi devices and media requirements it is difficult to distribute an advertisement in a single format.

Accordingly, there is a need for an improved system and method of providing advertisements to Wi-Fi devices.

BRIEF DESCRIPTION OF THE DRAWINGS

The present invention is pointed out with particularity in the appended claims. However, other features are described in the following detailed description in conjunction with the accompanying drawings in which:

DETAILED DESCRIPTION OF THE DRAWINGS

Figure 1:
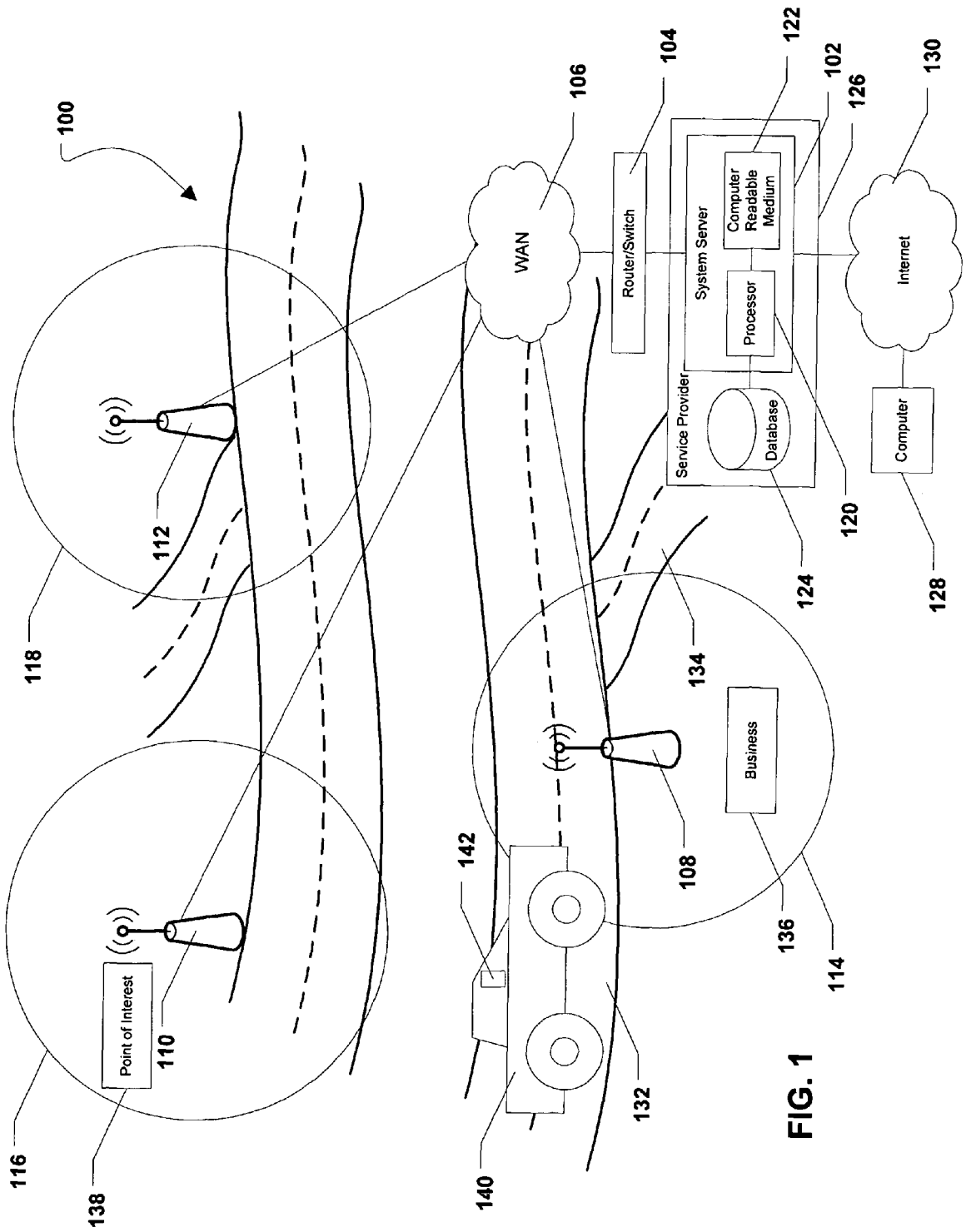
FIG. 1 is a block diagram representative of a wireless communication system over which one or more advertisements can be transmitted.

A method of advertising is disclosed and includes monitoring at least one Wi-Fi access point of a Wi-Fi network. Also, the method includes identifying at least one Wi-Fi device after the at least one Wi-Fi device associates with the Wi-Fi access point and determining at least one type of media file that is supported by the Wi-Fi device. Further, the method includes transmitting at least one advertisement to the device that is specific to the location of the Wi-Fi access point. The advertisement is transmitted in a format that corresponds to the at least one type of media file supported by the Wi-Fi device.

In a particular embodiment, the Wi-Fi access point is deployed adjacent to a freeway exit and the advertisement is associated with a business that is accessible via the freeway exit. Further, in a particular embodiment, the method includes monitoring the advertisements that are sent and the Wi-Fi devices to which the advertisements are sent. Additionally, the method includes generating a billing report and generating a usage report based on the advertisements sent and Wi-Fi devices to which the advertisements were sent.

In another particular embodiment, the method includes monitoring the movement of one or more Wi-Fi devices within the Wi-Fi network and transmitting a plurality of advertisements to the one or more Wi-Fi devices. Each of the advertisements complies with one or more types of media files that are supported by each of the one or more Wi-Fi devices. In a particular embodiment, the movement of the Wi-Fi devices is monitored based on a plurality of time and date stamps recorded for each Wi-Fi device as each Wi-Fi device associates within a plurality of Wi-Fi access points within the Wi-Fi network.

In yet another particular embodiment, the method further includes polling the at least one Wi-Fi device in order to determine the at least one type of media file supported. In an alternative embodiment, the method includes querying a database with a Wi-Fi device identification in order to determine the at least one type of media file supported. Further, in another alternative embodiment, the method includes querying a database with a make and model of the Wi-Fi device in order to determine the at least one type of media file supported.

In another embodiment, a system is disclosed and includes at least one Wi-Fi access point along a freeway and a database including a plurality of advertisements. At least one of the plurality of advertisements is associated with a business located along the freeway and at least one of the plurality of advertisements is stored as multiple media file formats. The system also includes a server that is coupled to the database and has access to the at least one Wi-Fi access point. In this embodiment, the server includes a processor, a computer readable medium accessible to the processor, and a computer program that is embedded within the computer readable medium. The computer program includes instructions to monitor the at least one Wi-Fi access point, instructions to determining at least one type of media file that is supported by the Wi-Fi device after the at least one Wi-Fi device associates with the Wi-Fi access point, and instructions to transmit at least one advertisement to the device specific to a freeway exit proximal to the Wi-Fi access point. In this embodiment, the advertisement is transmitted in a format that corresponds to the at least one type of media file supported by the Wi-Fi device.

In another embodiment, a server is disclosed and includes a processor, a computer readable medium that is accessible to the processor, and a computer program that is embedded within the computer readable medium. In this embodiment, the computer program includes instructions to determine one or more types of media files that are supported by a Wi-Fi device in communication with a Wi-Fi access point and instructions to transmit one or more advertisements to the at least one Wi-Fi device as the Wi-Fi device moves along a freeway within a vehicle. The one or more advertisements are transmitted in a format associated with one or more types of media files supported by the Wi-Fi device.

Referring initially to FIG. 1, a system of advertising to Wi-Fi devices is shown and is generally designated 100. As shown, the system 100 includes a system server 102 that is coupled to a router/switch 104. The router/switch 104 is coupled to a wide area network (WAN) 106. Further, the WAN 106 is coupled to a first Wi-Fi access point 108, a second Wi-Fi access point 110, and a third Wi-Fi access 112. In a particular embodiment, each Wi-Fi antenna 104, 106, 108 is an 802.11 antenna. Further, each Wi-Fi access point 108, 110, 112 provides a separate coverage area 114, 116, 118 for the system 100. Also, in a particular embodiment, each Wi-Fi antenna 104, 106, 108 can be a directional antenna that provides coverage in a predetermined direction relative to the Wi-Fi antenna 104, 106, 108. Accordingly, one or more directional Wi-Fi antennas 104, 106, 108 can be placed along a freeway such that the coverage area only overlaps a portion of the freeway, e.g., one or more lanes providing travel in a particular direction. As such, a user may only receive information via a Wi-Fi antenna 104, 106, 108 for a business that is located on the side of the freeway along which the user is traveling.

As depicted in FIG. 1, the system server 102 includes a processor 120 and a computer readable medium 122 that is accessible to the processor 120. A database 124 is also coupled to the system server 102. In a particular embodiment, the database 124 includes user information, e.g., the identifications of subscriber devices. Further, the database 124 can include a plurality of advertisements associated with one or more businesses or points of interest within the coverage areas 114, 116, 118 provided by the system 100 shown in FIG. 1. As shown, the system server 102, the processor 120, the computer readable medium 122, and the database 124 can be co-located at a service provider 126.

FIG. 1 further shows that a computer 128 can be coupled to the system server 102 via the Internet or a Wide Area Network 130. A system manager or some other person, e.g., a subscriber, can communicate with the system server 102 using the computer 116. As illustrated in FIG. 1, the Wi-Fi access points 108, 112, 114 can be deployed so that the coverage areas 114, 116, 118 provided by the Wi-Fi access points overlap a freeway 132. In a particular embodiment, the freeway 132 can be any type of roadway used to carry public transportation, e.g., one or more vehicles 140. Also, the freeway 132 can include at least one freeway exit 134 that provides access to one or more business 136. A Wi-Fi access point 108 can be deployed so that it is adjacent to, or proximal to, the freeway exit 134. Further, a Wi-Fi access point 110 can be deployed so that it is adjacent to, or proximal to, a point of interest 138.

In a particular embodiment, the system server 102 can include a computer program embedded within the computer readable medium 122. The computer program can include logic to execute a method that allows the system server 102 to monitor the movement of a Wi-Fi device 142 within the vehicle 140 as it progresses down an interstate. As the vehicle 140 and the Wi-Fi device 142 approach the freeway exit 134, one or more advertisements associated with the business 136 that is accessible via the freeway exit can be automatically transmitted to the Wi-Fi device 142. Information such as other services available via the freeway exit 134 can also be provided. Further, as the vehicle 140 and the Wi-Fi device 142 approach the point of interest 138, information related to the point of interest 138 can be automatically transmitted to the Wi-Fi device 142. As described in detail below, other information, including traffic alerts, can be transmitted to the Wi-Fi device 142.

Figure 2:
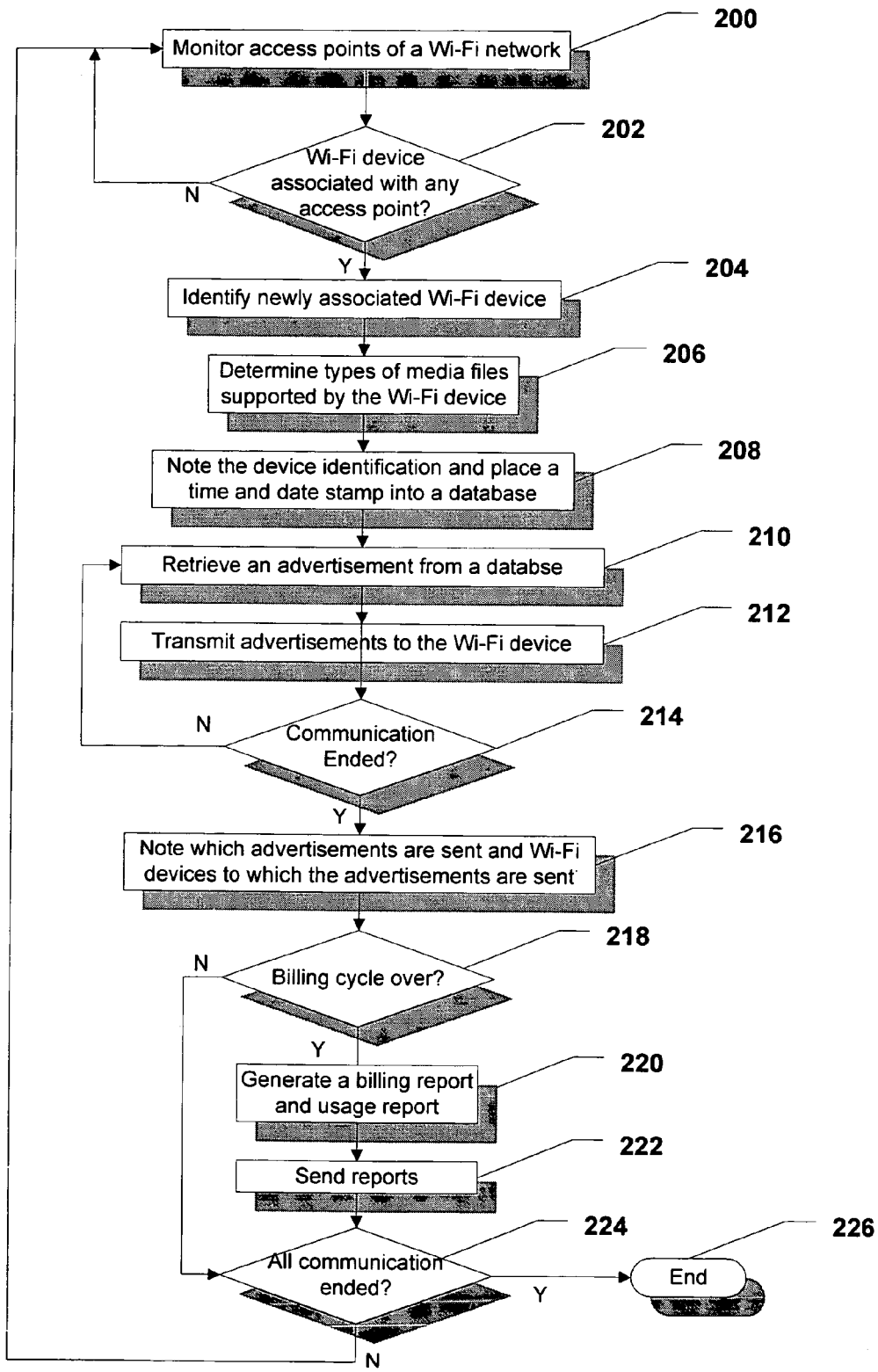
FIG. 2 is a flow chart to illustrate a method of transmitting advertisements to one or more Wi-Fi devices.

Referring to FIG. 2, a method of transmitting advertisements to one or more Wi-Fi devices is shown and commences at block 200. At block 200, a system server detects the presence of and monitors one or more Wi-Fi access points of a Wi-Fi network. Next, at block 202, the system server determines whether a Wi-Fi device has associated with any Wi-Fi access point of the Wi-Fi network. If not, the method returns to block 200 and continues as described herein. On the other hand, the method proceeds to block 204, and the system server identifies the newly associated Wi-Fi device. Thereafter, at block 206, the system server determines the types of medial files that are supported by the newly associated Wi-Fi device.

In an illustrative embodiment, the media files supported by the Wi-Fi device can be audio data files, video data files, still image data files, etc. Particularly, the still image data files can be joint photographic experts group (JPEG) data files, graphics interchange format (GIF) data files, tagged image data file format (TIFF) data files, Adobe Photoshop (PSD) data files, portable networks graphics (PNG) data files, windows metadata file (WMF) data files, or any other types of image data files that can be downloaded to and viewed at the Wi-Fi device.

Further, the video data files can be moving picture experts group (MPEG) data files, audio video interleave (AVI) data files, Windows media video (WMV) data files, advanced streaming format (ASF) data files, Quicktime (MOV) data files, JAVA, Real Media (RM) data files, or any other type of video data files that can be downloaded to and viewed at Wi-Fi device.

In a particular embodiment, the audio data files can be MPEG audio layer three (MP3) data files, waveform audio format (WAV) data files, windows media audio (WMA) data files, OGG data files, Monkey's Audio digital data files (APE) data file, VOX data files, Real Audio (RA) data files, synthetic music mobile application format (MMF) data files, musical instrument digital interface (MID) data files, phrase format (SPF) data files, Qualcomm PureVoice audio data files (QCP) or any other sound data files that can be listened to at the Wi-Fi device. In an illustrative embodiment, real-time voice and video can be transmitted using the real-time protocol (RTP) and the video datagram protocol (VDP).

In a particular embodiment, the server can retrieve the information concerning the media files supported by a particular device from a database by querying the database with a user identification or an identification associated with the Wi-Fi device. The information can also be retrieved by querying the database with a device make and model identification. Further, in an alternative embodiment, the server can poll the device in order to make this determination.

At block 208, the server notes the device identification and places a time and date stamp into a database. Moving to block 210, the server retrieves an advertisement associated with a business or point of interest near which the Wi-Fi access point is deployed. Next, at block 212, the server transmits the advertisement to the Wi-Fi device.

Proceeding to decision step 214, the server determines whether communication between the Wi-Fi device and the Wi-Fi access point has ended. If not, the method returns to block 210 and continues as described herein. On the other hand, if the communication between the Wi-Fi device and the Wi-Fi access point has ended, the method proceeds to block 216 and the server notes which advertisements were sent and which Wi-Fi devices were sent advertisements. Moving to block 218, the server determines whether a billing cycle has ended. If so, the server generates a billing report and usage report for each advertising customer at block 220. Next, at block 222, the server sends the generated billing reports and usage reports to each advertising customer. The logic then moves to decision step 224. Returning to decision step 218, if the billing cycle has not ended, the method jumps to decision step 224 and continues as described below.

At decision step 224, the server determines whether all communication with the Wi-Fi network has ended. If so, the method moves to state 226 and ends. Otherwise, if communication has not ended the method returns to block 200 and continues as described herein.

In a particular embodiment, advertising customers can be charged based on a service level agreement. For example, a fourth service tier advertisement may be the most expensive advertisement and the first service tier advertisement may be the least expensive advertisement. Since the server polls a Wi-Fi device to determine a supported media type before sending an advertisement, advertisements are delivered in the supported format to be received and viewed at the Wi-Fi device. Further, an advertising customer is charged for those advertisements that can be viewed at the device. In other words, an advertising customer may select a fourth service tier, but the advertising customer may only be charged for fourth service tier advertisements when real-time voice and video can be received and viewed at a particular Wi-Fi device. Otherwise, the advertising customer can be charged for a third service tier advertisement if the associated media file format can be received and viewed at the particular Wi-Fi device.

In a particular embodiment, since the server records the time and date before transmitting advertisements, advertisements that are associated with a particular business may not be sent if the business is closed. Further, by monitoring the movement of a Wi-Fi device while it is in communication with a network as it travels within a user vehicle along a freeway, advertisements can be sent for a business when the Wi-Fi device associates with a Wi-Fi access point that adjacent to the exit by which the business can be accessed. In an alternative embodiment, the server can begin transmitting advertisements to the Wi-Fi device as it associates with a Wi-Fi access point located before the Wi-Fi access point adjacent to the exit by which the business can be accessed. An advertisement customer can pay extra to have the server send advertisements to Wi-Fi devices before the Wi-Fi device actually associates with the Wi-Fi access point adjacent to the exit by which the business can be accessed. For example, the further from the Wi-Fi access point adjacent to the exit associated with the business that advertisements get transmitted for the business, the greater the advertising customer may be charged.

Also, the advertising customer can be charged more if an advertisement is transmitted to a Wi-Fi device before the Wi-Fi device has entered the coverage area associated with a particular Wi-Fi access point, e.g., as the Wi-Fi device approaches the coverage area associated with the particular Wi-Fi access point.

Figure 3:
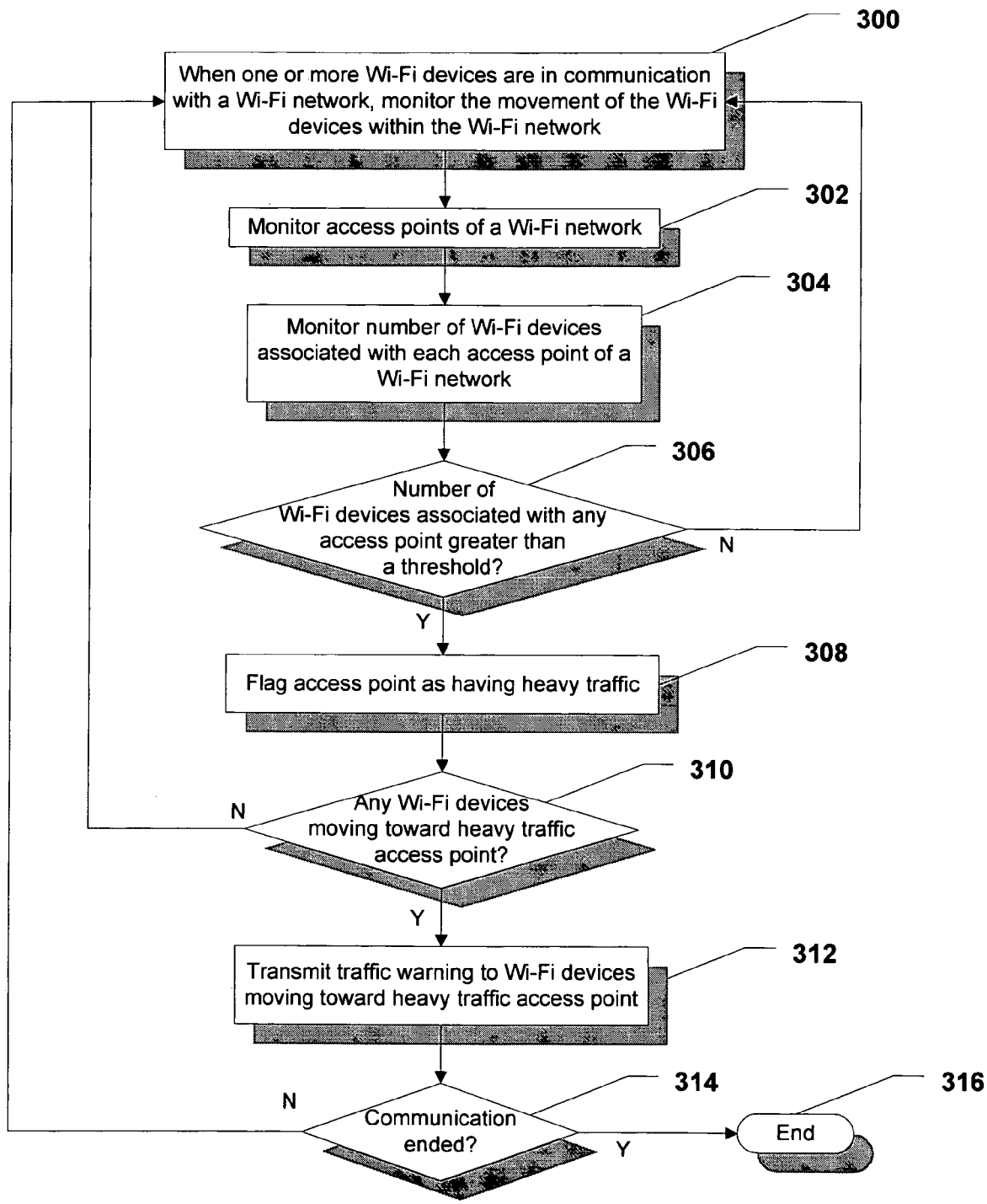
FIG. 3 is a flow chart to illustrate a method of transmitting traffic warnings to one or more Wi-Fi devices.

FIG. 3 shows a method of transmitting traffic warnings to one or more Wi-Fi devices that are in communication with a Wi-Fi network. Beginning at block 300, when one or more Wi-Fi devices are in communication with the Wi-Fi network, a system server monitors the movement of the Wi-Fi device as they move within the network. In a particular embodiment, the movement of the Wi-Fi devices can be monitored by tracking the time and date stamps of the Wi-Fi devices as the associated and disassociate with the various Wi-Fi access points of the Wi-Fi network. At block 302, the system server also monitors one or more Wi-Fi access points of a Wi-Fi network.

Moving to block 304, the system server monitors the number of Wi-Fi devices that are associated with each Wi-Fi access point of the Wi-Fi network. At decision step 306, the system server determines whether the number of Wi-Fi devices that are associated with any Wi-Fi access point greater than a threshold. If not, the method returns to block 300 and continues as described herein. Conversely, if the number of Wi-Fi devices associated with a Wi-Fi access point are greater than the threshold, the method proceeds to block 308 and the server flags that Wi-Fi access point as having heavy traffic.

Next, at decision step 310, the system server determines whether any Wi-Fi devices are moving toward the heavy traffic Wi-Fi access point, if not the method returns to block 300 and continues as described. On the other hand, if any Wi-Fi devices are moving toward the Wi-Fi access point that is flagged as having heavy traffic, the method proceeds to block 312 and the server transmits a traffic warning to those Wi-Fi devices that are moving toward the heavy traffic Wi-Fi access point. Proceeding to decision step 314, the server determines whether one or more Wi-Fi devices remain in communication with the Wi-Fi network. If so, the method returns to block 300 and continues as described herein. Otherwise, the method proceeds to state 316 and ends.

In a particular embodiment, as described above, the system server only tracks the movement of Wi-Fi devices that belong to users who subscribe to a service. Further, each Wi-Fi access point can allow associations with subscriber Wi-Fi devices and deny associations with non-subscriber Wi-Fi devices. As such, in an alternative embodiment, the system server can monitor the attempts to connect with the Wi-Fi access point by subscriber Wi-Fi devices and non-subscriber Wi-Fi devices over a period of time in order to estimate the traffic around each Wi-Fi access point.

Figure 4:
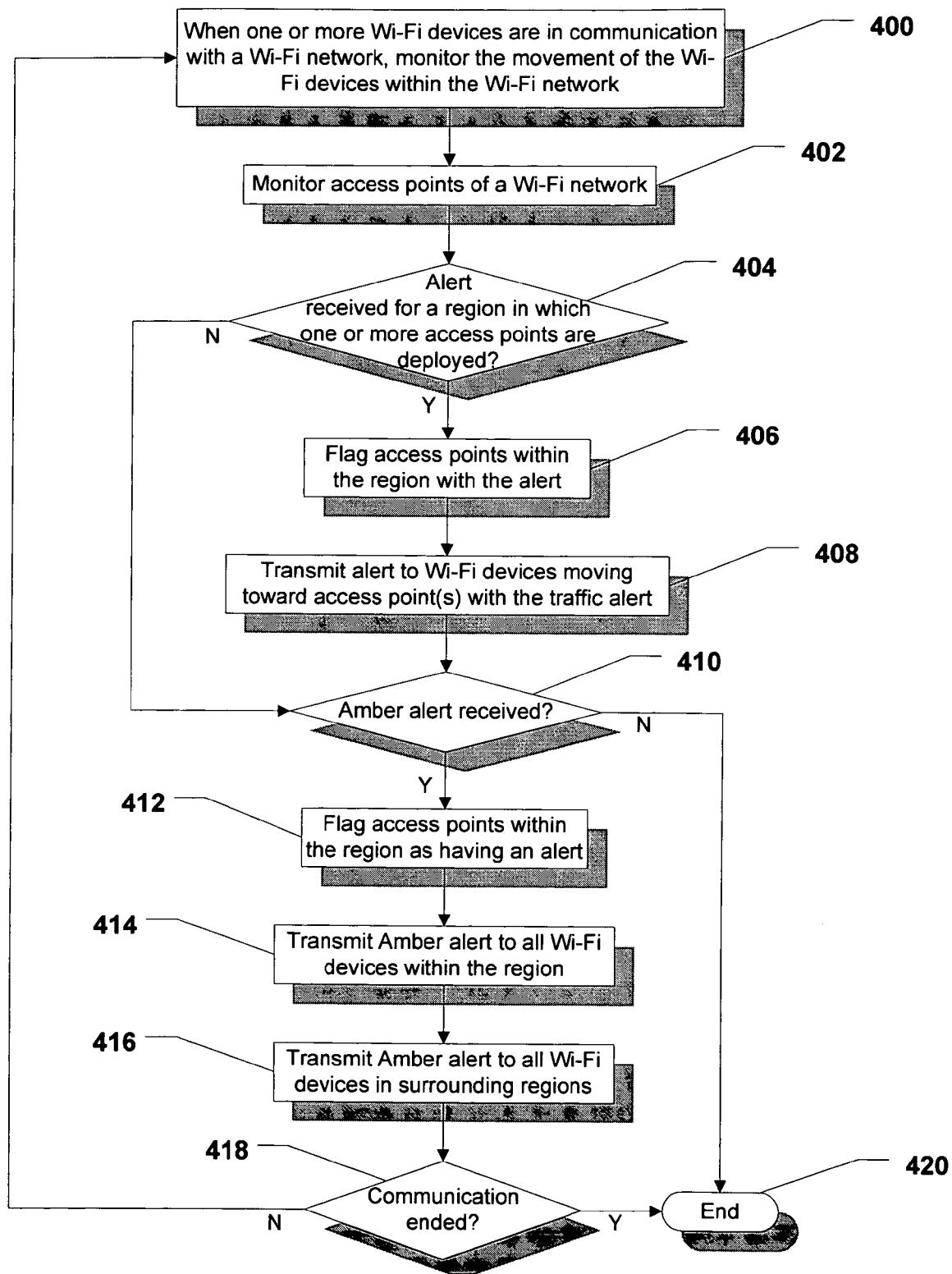
FIG. 4 is a flow chart to illustrate an alternative method of transmitting traffic warnings to one or more Wi-Fi devices.

Referring to FIG. 4, an alternative embodiment of a method of transmitting traffic warnings to one or more Wi-Fi device in communication with a Wi-Fi network is shown and commences at block 400. At block 400, when one or more Wi-Fi devices are in communication with a Wi-Fi network, a system server monitors the movement of the Wi-Fi devices as they move within the network. At block 402, the system server also monitors one or more Wi-Fi access points of a Wi-Fi network. Proceeding to decision step 404, the server determines whether an alert is received for a region in which one or more Wi-Fi access point are deployed. In an illustrative embodiment, the alert can be a traffic alert, a road condition alert, a weather alert, etc.

At decision step 404, when an alert is received for a particular region, the method continues to block 406 and the server flags each Wi-Fi access point located with the region as having an alert. At block 408, the server transmits the alert to any Wi-Fi devices that are moving toward any Wi-Fi access points that are flagged with the alert. The method then moves to decision step 410. Returning to decision step 404, if an alert is not received, the method also moves to decision step 410.

At decision step 410, the system server determines whether an Amber alert is received for a region. When an Amber alert is received for a particular region, the method continues to block 412 and the server flags any Wi-Fi access points within the region with the Amber alert. At block 414, the server transmits the Amber alert to all Wi-Fi devices that are in communication with the Wi-Fi access points that are flagged with the Amber alert. Moving to block 416, the server also transmits the Amber alert to all Wi-Fi devices that are in communication with Wi-Fi access points that surround the region in which the Amber alert is received. Continuing to decision step 418, the server determines whether one or more Wi-Fi devices remain in communication with the Wi-Fi network. If so, the method returns to block 400 and continues as described herein. Otherwise, the method ends at state 420.

Figure 5:
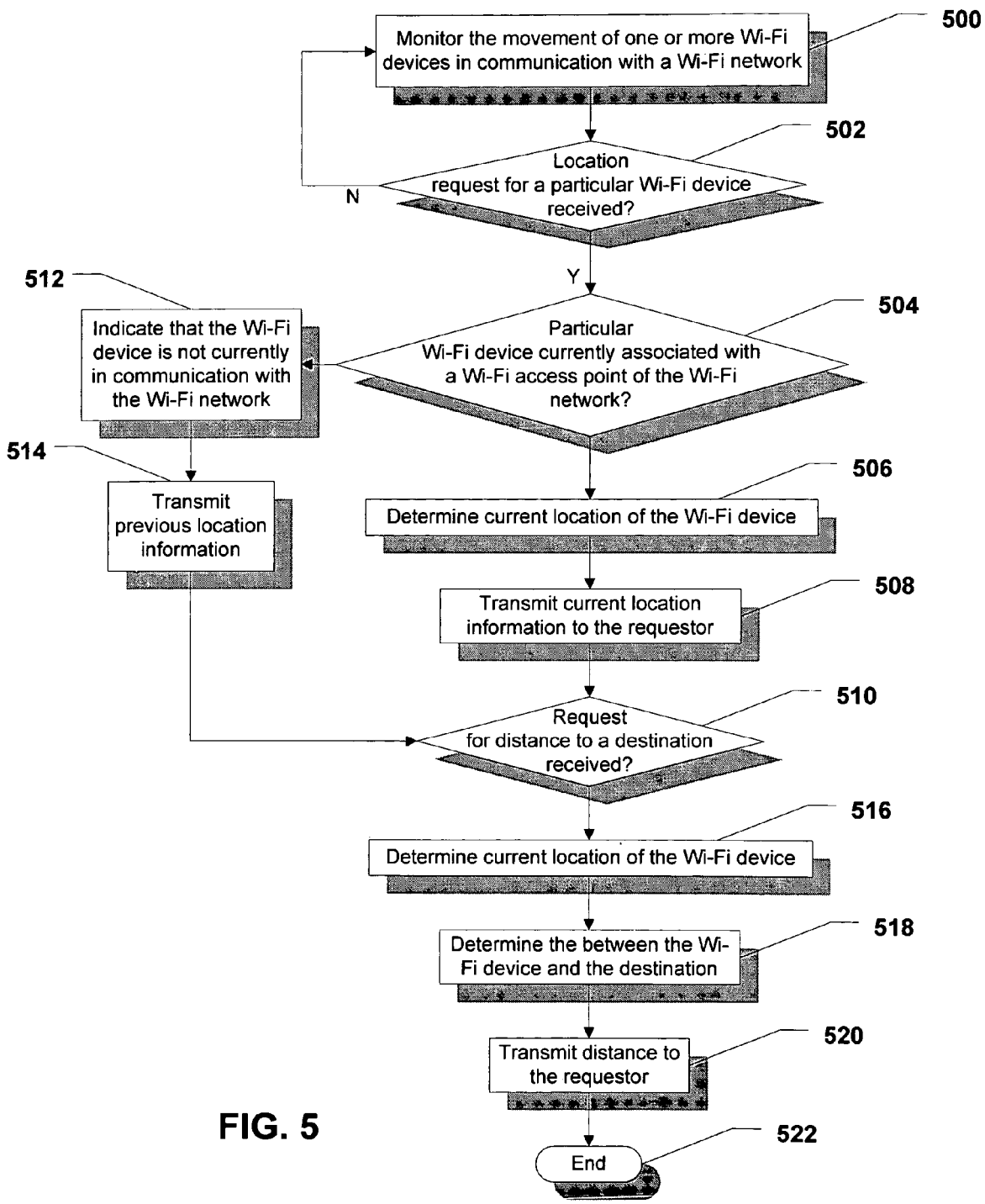
FIG. 5 is a flow chart to illustrate a method of transmitting information related to the location of a Wi-Fi device.

Referring now to FIG. 5, a method of transmitting information related to the location of a Wi-Fi device is shown and commences at block 500. At block 500, when a system server detects one or more Wi-Fi devices in communication with the Wi-Fi network, the system server monitors the movement of the Wi-Fi devices as they remain in communication with the Wi-Fi network. Next, at decision step 502, the server determines whether a location request for a particular Wi-Fi device is received. In a particular embodiment, the request is sent from another user, e.g., a family member, via a computer connected to the Internet or a Wide Area Network. However, the request can be received from the actual Wi-Fi device that is the subject of the location request.

At decision step 502, if a location request is not received, the method returns to block 500 and continues as described herein. Conversely, if a location request is received for a particular Wi-Fi device, the method proceeds to decision step 504. At decision step 504, the system server determines whether the particular Wi-Fi device is currently in communication with the network. If so, the system server determines the current location of the device, at block 506, and transmits the current location information to the requestor, at block 508. The method then continues to decision step 510.

Returning to decision step 504, if the particular Wi-Fi device that is the subject of the location request is not currently in communication with the network, the method moves to block 512 and the server indicates that the Wi-Fi device is not currently in communication with the network. At block 514, the server transmits the previous location information for the Wi-Fi device to the requester. The method then proceeds to decision step 510.

At decision step 510, the server determines whether a request for distance to a destination received for a particular Wi-Fi device. The request for the distance can be received from the particular Wi-Fi device that is the subject of the distance request or from another device such as a computer coupled to the Internet or a Wide Area Network. If a request for distance is received for a particular Wi-Fi device, the method proceeds to block 516, and the server determines the current location of the Wi-Fi device. Thereafter, at block 518, the server determines the distance between the Wi-Fi device and the destination. Continuing to block 520, the server transmits the distance to the requestor. The method then ends at state 522. Returning to decision step 510, if a request for distance to a destination is not received, the method then ends at state 522.

With the configuration of structure described above, the system and method of providing advertisements to Wi-Fi devices expands the potential market available via traditional advertising by including the various Wi-Fi devices that are in constant use. Further, other information can be proactively sent to Wi-Fi devices. That information can include weather alerts, traffic alerts, road condition alerts, Amber alerts, etc. Also, the system can be used to deliver movies on demand via the network provided.

Other information may be sent to the Wi-Fi devices. For example, membership alerts may be sent to members of certain groups, e.g., the American Automobile Association (AAA). Also, healthcare information, such as hospital locations, may be sent to individuals with health concerns traveling in unfamiliar areas. Additionally, certain advertisements may be broadcast to all devices in communication with the network. On the other hand, certain advertisements may be unicast to particular Wi-Fi devices, e.g., to existing customers of a particular business.

In an alternative embodiment, searches can be initiated from a Wi-Fi device. A search can be initiated using a voice command, transmitting a text message, transmitting a picture to the network, swiping a credit card at a Wi-Fi device (e.g., to locate a particular gas station), passing a Bluetooth device near a Bluetooth enabled Wi-Fi device, etc.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of advertising, the method comprising:
   determining at least one type of media file format supported by each of a first wireless device and a second wireless device when the first wireless device and the second wireless device enter a coverage area of a wireless data access point;
   transmitting at least one advertisement for an advertising entity to the first wireless device via the wireless data access point in a first format that complies with the at least one type of media file format supported by the first wireless device;
   transmitting at least one advertisement for the advertising entity to the second wireless device via the wireless data access point in a different format than the first format, wherein the at least one advertisement sent to the second wireless device is transmitted in the at least one type of media file format supported by the second wireless device; and
   generating a billing report for the advertising entity based on the first format of the at least one advertisement transmitted to the first wireless device and the different format of the at least one advertisement transmitted to the second wireless device.

2. The method of claim 1, wherein the wireless data access point is deployed adjacent to a freeway exit and the at least one advertisement transmitted to the first wireless device is associated with a business accessible via the freeway exit.

3. The method of claim 1, further comprising monitoring the at least one advertisement sent to the first wireless device.

4. The method of claim 3, further comprising generating a usage report based on the at least one advertisement sent to the first wireless device.

5. The method of claim 1, further comprising monitoring movement of the first wireless device within a wireless data network and transmitting a plurality of advertisements to the first wireless device, wherein the plurality of advertisements comply with the at least one type of media file format supported by the first wireless device.

6. The method of claim 5, wherein the movement of the first wireless device is monitored based on a plurality of time and date stamps.

7. The method of claim 1, further comprising polling the first wireless device in order to determine the at least one type of media file format supported by the first wireless device.

8. The method of claim 1, further comprising querying a database with a wireless device identification in order to determine the at least one type of media file format supported by the first wireless device.

9. The method of claim 1, further comprising querying a database with a make and model of the first wireless device in order to determine the at least one type of media file format supported by the first wireless device.

10. A system, comprising:
    at least one wireless data access point along a road;
    a database including a plurality of advertisements, wherein at least one advertisement of the plurality of advertisements is associated with a business located along the road, and wherein the at least one advertisement is associated with an advertising entity and is stored as multiple media file formats;

a server coupled to the database and having access to the at least one wireless data access point, the server comprising:

a processor;

a computer readable medium accessible to the processor; and a computer program embedded within the computer readable medium, the computer program comprising:

instructions to determine at least one type of media file format supported by a wireless device after the wireless device associates with the at least one wireless data access point;

instructions to transmit the at least one advertisement to the wireless device via the at least one wireless data access point, wherein the at least one advertisement is transmitted as a media file format from the multiple media file formats, wherein the media file format is supported by the wireless device;

instructions to track the media file formats of advertisements for the advertising entity sent to wireless devices via the at least one wireless access point; and instructions to generate a billing report for the advertising entity based at least partially on the tracked media file formats.

11. The system of claim 10, wherein the at least one advertisement is specific to an exit from the road that is not located within a coverage area provided by the wireless data access point.

12. The system of claim 11, wherein the computer program further comprises instructions to charge the advertising entity for a transmitted advertisement based on whether the wireless device is located within the coverage area provided by the wireless data access point.

13. The system of claim 10, wherein the billing report includes a higher price for tracked media file formats that include voice and video than for tracked media formats that do not include voice and video.

14. The system of claim 10, wherein the media file format of the at least one advertisement transmitted to the wireless device corresponds to a service tier of a service level agreement.

15. The system of claim 14, wherein the service tier is lower than a second service tier, wherein advertisements in the second service tier includes video and voice.

16. A server, comprising:

a processor;

a computer readable medium accessible to the processor; and a computer program embedded within the computer readable medium, the computer program comprising:

instructions to determine one or more types of media file formats that are supported by a wireless device in communication with a wireless data access point;

instructions to transmit one or more advertisements to the wireless device as the wireless device moves along a road within a vehicle, the one or more advertisements transmitted in media file formats supported by the wireless device;

instructions to track which types of media file formats of a plurality of media formats available for a particular advertisement associated with an advertising entity are sent to each wireless device of a plurality of wireless devices associated with the wireless data access point; and instructions to generate a billing report for the advertising entity based on which types of media file formats for the particular advertisement are sent to the plurality of wireless devices.

17. The server of claim 16, further comprising a database, the database storing a plurality of advertisements associated with one or more businesses located along the road.

18. The server of claim 17, wherein each of the plurality of advertisements is stored in multiple formats associated with multiple types of media files.

19. The server of claim 16, wherein the instructions to transmit one or more advertisements to the wireless device comprise instructions to transmit the one or more advertisements when the wireless device is in a coverage range of the wireless data access point.

20. The server of claim 16, wherein the one or more advertisements comprise a particular advertisement for a business near the road, and wherein the instructions to transmit the one or more advertisements to the wireless device comprise:

instructions to transmit the particular advertisement when the business is open; and instructions to not send the particular advertisement when the business is closed.

\* \* \* \* \*